(12) United States Patent
Tanaka

(10) Patent No.: US 11,362,356 B2
(45) Date of Patent: Jun. 14, 2022

(54) FUEL CELL SYSTEM

(71) Applicant: TOYOTA JIDOSHA KABUSHIKI KAISHA, Toyota (JP)

(72) Inventor: Hiromi Tanaka, Susono (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 17/115,027

(22) Filed: Dec. 8, 2020

(65) Prior Publication Data

US 2021/0202969 A1    Jul. 1, 2021

(30) Foreign Application Priority Data

Dec. 25, 2019  (JP) .............................. JP2019-235184

(51) Int. Cl.
| | | |
|---|---|---|
| *H01M 8/04* | (2016.01) | |
| *H01M 8/04746* | (2016.01) | |
| *H01M 8/04119* | (2016.01) | |

(52) U.S. Cl.
CPC ... *H01M 8/04753* (2013.01); *H01M 8/04126* (2013.01)

(58) Field of Classification Search
CPC ....................... H01M 8/04776; H01M 8/04932
See application file for complete search history.

(56) References Cited

U.S. PATENT DOCUMENTS

| | | | |
|---|---|---|---|
| 11,011,761 B2* | 5/2021 | Tsubouchi | H01M 8/0267 |
| 2011/0274998 A1 | 11/2011 | Ichikawa et al. | |
| 2015/0017562 A1 | 1/2015 | Ichikawa et al. | |
| 2015/0037700 A1 | 2/2015 | Ichikawa et al. | |
| 2016/0141659 A1* | 5/2016 | Yamamoto | H01M 8/04753 |
| | | | 429/414 |
| 2018/0034087 A1* | 2/2018 | Watanabe | H01M 8/04014 |

FOREIGN PATENT DOCUMENTS

| | | |
|---|---|---|
| JP | 2010-123501 A | 6/2010 |
| WO | WO2013-129453 A1 | 9/2013 |
| WO | WO2013-129553 A1 | 9/2013 |

* cited by examiner

*Primary Examiner* — Olatunji A Godo
(74) *Attorney, Agent, or Firm* — Finnegan, Henderson, Farabow, Garrett & Dunner, LLP

(57) ABSTRACT

A fuel cell system includes a fuel cell, an injection device configured to inject anode gas, an ejector mechanism through which the anode gas injected from the injection device flows, a circulation path configured to return the anode gas, discharged from the fuel cell, to the ejector mechanism, a supply path configured to supply the anode gas, discharged from the fuel cell together with the anode gas injected from the injection device from the ejector mechanism, to the fuel cell, and a controller.

9 Claims, 11 Drawing Sheets

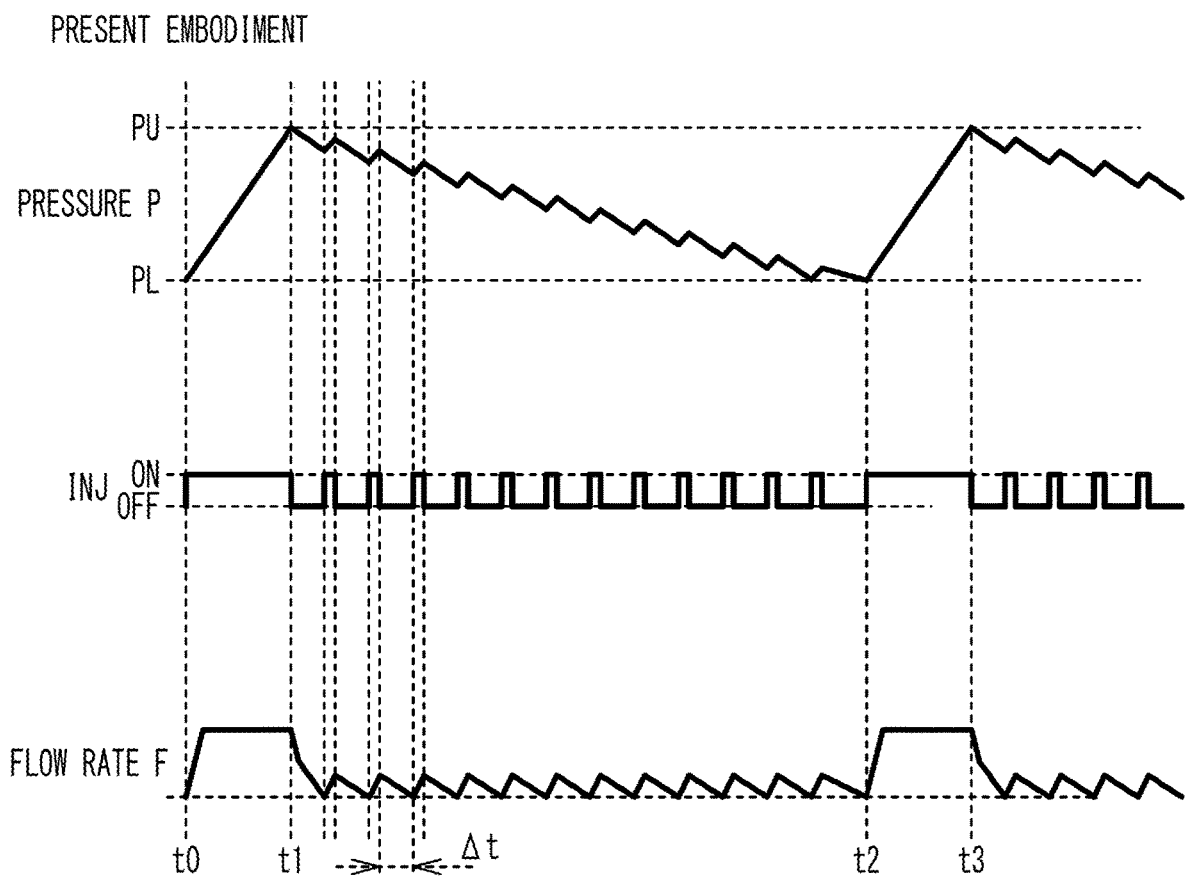

FUEL CELL SYSTEM

CROSS-REFERENCE TO RELATED APPLICATION

This application is based upon and claims the benefit of priority of the prior Japanese Patent Application No. 2019-235184, filed on Dec. 25, 2019, the entire contents of which are incorporated herein by reference.

TECHNICAL FIELD

The present disclosure relates to a fuel cell system.

BACKGROUND

In some cases, a fuel cell system performs a pulsating operation that causes a pressure of the anode gas to be supplied to a fuel cell to pulsate within a predetermined range. In such a pulsating operation, a pressure-increasing period, in which a pressure of the anode gas increases due to the injection of the anode gas from an injection device, and a pressure-decreasing period, in which the pressure of the anode gas decreases due to stop of the injection of the anode gas and consumption of the anode gas for power generation of the fuel cell, are alternately repeated. In the pressure-increasing period, the anode gas is injected and flows through the fuel cell, which facilitates discharging impurities such as liquid water and nitrogen from the fuel cell (for example, see Japanese Unexamined Patent Application Publication No. 2010-123501).

In the pressure-decreasing period, the fluidity of the anode gas in the fuel cell might decrease, and then liquid water and impurities might remain at, for example, positions in the fuel cell. Thus, in the pressure-decreasing period, the anode gas might not tend to be supplied to positions in the fuel cell, which might degrade power generation efficiency of the fuel cell.

SUMMARY

It is therefore an object of the present disclosure to provide a fuel cell system suppressing degradation in power generation efficiency of a fuel cell.

The above object is achieved by a fuel cell system including: a fuel cell; an injection device configured to inject anode gas; an ejector mechanism through which the anode gas injected from the injection device flows; a circulation path configured to return the anode gas, discharged from the fuel cell, to the ejector mechanism; a supply path configured to supply the anode gas, discharged from the fuel cell together with the anode gas injected from the injection device from the ejector mechanism, to the fuel cell; and a controller configured to control the injection device to perform a pulsating operation in which a pressure-increasing period and a pressure-decreasing period are alternately repeated such that a pressure of the anode gas to be supplied to the fuel cell pulsates within a predetermined range, the pressure-increasing period being in which the pressure increases, the pressure-decreasing period being in which the pressure decreases, wherein the controller is configured to control the injection device to inject an amount of the anode gas larger than a consumption amount of the anode gas consumed by the fuel cell in the pressure-increasing period, and to control the injection device to inject an amount of the anode gas smaller than the consumption amount in the pressure-decreasing period.

The controller may be configured to control the injection device to intermittently inject the anode gas in the pressure-decreasing period.

The injection device may include a valve, the controller may be configured to control an opening degree of the valve, an injection flow rate of the anode gas may increase as the opening degree of the valve increases, and the controller may be configured to maintain the opening degree of the valve smaller in the pressure-decreasing period than in the pressure-increasing period so as to control the injection device to continuously inject the anode gas in the pressure-decreasing period.

The controller may be configured to control a period during which the injection of the anode gas is stopped to be 0.5 seconds or less in the pressure-decreasing period.

The controller may be configured to control the injection device to inject the anode gas such that the pressure temporarily increases in the pressure-decreasing period.

The injection device may include first and second injection devices injecting the anode gas, an injection flow rate of the anode gas of the second injection device may be greater than an injection flow rate of the anode gas of the first injection device, the controller may be configured to control at least the second injection device to inject the anode gas in the pressure-increasing period, and the controller may be configured to control the first injection device to inject the anode gas and stop injection of the anode gas from the second injection device in the pressure-decreasing period.

The ejector mechanism may include a single ejector through which the anode gas injected from any of the first and second injection devices flows.

The ejector mechanism may include first and second ejectors disposed at a downstream side with respect to the first and second injection devices, respectively, and the circulation path may include first and second branch paths branched from each other and connected to the first and second ejectors, respectively.

The controller may be configured to perform the pulsating operation in a middle or low load operation of the fuel cell.

BRIEF DESCRIPTION OF THE DRAWINGS

FIG. 3 is a timing chart of an intermittent injection pulsating operation in a present embodiment;

DETAILED DESCRIPTION

[Configuration of Fuel Cell System]

Figure 1:
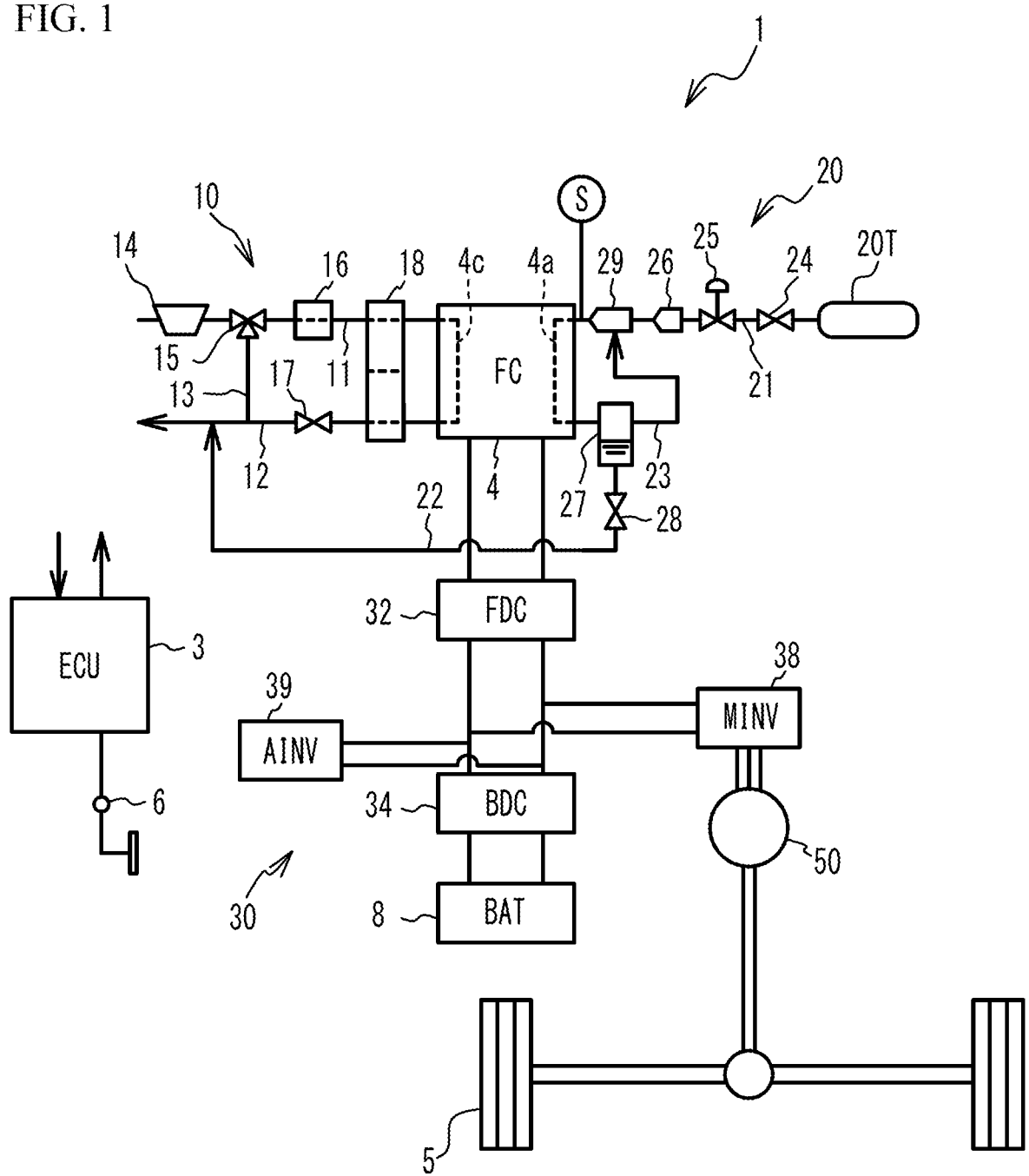
FIG. 1 is a schematic configuration view of a fuel cell system.

FIG. 1 is a schematic configuration view of a fuel cell system 1. The fuel cell system 1 is mounted on a vehicle, and includes an electronic control unit (ECU) 3, a fuel cell (hereinafter, referred to as FC) 4, a secondary battery (hereinafter, referred to as BAT) 8, a cathode gas supply system 10, an anode gas supply system 20, and a power control system 30. Additionally, the fuel cell system 1 includes a cooling system (not illustrated) that circulates cooling water through the FC 4 to cool the FC 4. Further, the vehicle equipped with the fuel cell system 1 includes a motor 50 for traveling, wheels 5, and an accelerator opening degree sensor 6.

The FC 4 includes unit cells. The unit cell is a solid polymer electrolyte type that generates power by receiving supply of a cathode gas and an anode gas. The FC 4 is provided with a cathode flow path 4c through which the cathode gas flows and an anode flow path 4a through which the anode gas flows. The unit cell includes a membrane electrode assembly, and a cathode separator and an anode separator sandwiching the membrane electrode assembly. The cathode flow path 4c is a space through which the cathode gas flows, and this space is defined mainly between the membrane electrode assemblies and the cathode separators. The anode flow path 4a is a space through which the anode gas flows, and this space is defined mainly between the membrane electrode assemblies and the anode separators. The membrane electrode assembly includes an electrolyte membrane, a cathode catalyst layer formed on a surface of the electrolyte membrane at the cathode flow path 4c side, and an anode catalyst layer formed on a surface of the electrolyte membrane at the anode flow path 4a side.

The cathode gas supply system 10 supplies air containing oxygen as a cathode gas to the FC 4. The cathode gas supply system 10 includes a supply pipe 11, a discharge pipe 12, a bypass pipe 13, an air compressor 14, a three-way valve 15, an intercooler 16, a back pressure valve 17, and a humidifier 18. The supply pipe 11 is connected to a cathode inlet manifold of the FC 4. The ECU 3 controls driving of the air compressor 14, the three-way valve 15, and the back pressure valve 17. The discharge pipe 12 is connected to a cathode outlet manifold of the FC 4. The bypass pipe 13 allows the supply pipe 11 and the discharge pipe 12 to communicate with each other. The three-way valve 15 is provided at a connection portion of the supply pipe 11 and the bypass pipe 13. The three-way valve 15 switches a communication state of the supply pipe 11 and the bypass pipe 13 to a cut-off state thereof and the cut-off state thereof to the communication state thereof. The air compressor 14, the three-way valve 15, and the intercooler 16 are arranged in the supply pipe 11 in this order from an upstream side. The back pressure valve 17 is disposed in the discharge pipe 12 at an upstream side with respect to a connection portion of the discharge pipe 12 and the bypass pipe 13. The humidifier 18 is provided over the supply pipe 11 and the discharge pipe 12. Specifically, the humidifier 18 is provided in the supply pipe 11 at a downstream side with respect to the intercooler 16, and in the discharge pipe 12 at an upstream side with respect to the back pressure valve 17.

The air compressor 14 supplies air containing oxygen as a cathode gas to the FC 4 through the supply pipe 11. The cathode gas supplied to the FC 4 is discharged through the discharge pipe 12. The intercooler 16 cools the cathode gas to be supplied to the FC 4. The back pressure valve 17 adjusts the back pressure at the cathode side of the FC 4. The ECU 3 adjusts the flow rate of the cathode gas to be supplied to the FC 4 by controlling rotation speed of the air compressor 14. Further, the ECU 3 adjusts the flow rate of the cathode gas to be supplied to the FC 4 and the flow rate of the cathode gas to be bypassed thereto by controlling opening degrees of the three-way valve 15 and the back pressure valve 17. The humidifier 18 humidifies the cathode gas flowing through the supply pipe 11 and before being supplied to the FC 4 by using moisture in the cathode off-gas discharged from the FC 4 flowing through the discharge pipe 12. The humidifier 18 is provided with a moisture permeable film so as to partition a flow path of the cathode gas and a flow path of the cathode off-gas. The moisture permeates through this moisture permeable film from the cathode off-gas to the cathode gas. In this manner, the cathode gas is humidified. Instead of the three-way valve 15, a sealing valve may be provided in the supply pipe 11, and a flow dividing valve may be provided in the bypass pipe 13.

The anode gas supply system 20 supplies hydrogen gas as an anode gas to the FC 4. The anode gas supply system 20 includes a tank 20T, a supply pipe 21, a discharge pipe 22, a circulation pipe 23, a tank valve 24, a pressure regulating valve 25, and an injector (hereinafter, referred to as INJ) 26, a gas-liquid separator 27, a drain valve 28, and an ejector (hereinafter, referred to as EJ) 29. The ECU 3 controls the driving of the tank valve 24, the pressure regulating valve 25, the INJ 26, and the drain valve 28. The tank 20T is connected to an anode inlet manifold of the FC 4 through the supply pipe 21. The tank 20T stores hydrogen gas as an anode gas. The tank valve 24, the pressure regulating valve 25, and the INJ 26 are arranged in this order from an upstream side of the supply pipe 21. An end of the circulation pipe 23 is connected to an anode outlet manifold of the FC 4. The other end of the circulation pipe 23 is connected to the EJ 29. The gas-liquid separator 27 is disposed in the circulation pipe 23. An end of the discharge pipe 22 is connected to a lower end of the gas-liquid separator 27 in the gravity direction. The other end of the discharge pipe 22 is connected to the discharge pipe 12 of the cathode gas supply system 10. The drain valve 28 is disposed in the path of the discharge pipe 22.

The opening degree of the pressure regulating valve 25 is adjusted in a state where the tank valve 24 opens, and then the anode gas is injected by opening the INJ 26. The INS 26 is an example of an injection device. The anode gas injected from the INS 26 flows through the EJ 29 and the supply pipe 21, and then is supplied to the FC 4. A pressure sensor S is provided in the supply pipe 21 at a downstream side with respect to the INS 26 and EJ 29 and at an upstream side with respect to the anode inlet manifold of the FC 4. The pressure sensor S detects a pressure, in the supply pipe 21 at the downstream side with respect to the INS 26 and the EJ 29, as a value representing the pressure of the anode gas to be supplied to the FC 4. The gas-liquid separator 27 separates and stores moisture from the anode gas discharged from the FC 4. The water stored in the gas-liquid separator 27 is discharged to the outside of the fuel cell system 1 through the discharge pipes 22 and 12, when the drain valve 28 opens. The circulation pipe 23 is provided for returning the anode gas discharged from the FC 4 to the FC 4 again, and is an example of a circulation path. The anode gas injected from the INJ 26 flows through the EJ 29, which generates negative pressure in the EJ 29. This negative pressure causes the anode gas discharged from the FC 4 to be sucked into the ES 29 through the gas-liquid separator 27, and then the anode gas discharged from the FC 4 together with the anode gas injected from the INS 26 are supplied to the FC 4 through the supply pipe 21. The supply pipe 21 is an example of a supply path. The EJ 29 is an example of an ejector mechanism.

The INJ 26 includes: a valve seat having an injection hole for injecting the anode gas; a valve element driven by a solenoid to open and close the injection hole; and a spring for urging the valve element toward the valve seat. When the solenoid of the INS 26 is energized, the valve element is moved away from the valve seat, and then the anode gas is injected from the injection hole. When the energization to the solenoid of the INS 26 is stopped, the valve element contacts the valve seat according to the urging force of the spring, which stops the injection of the anode gas.

The power control system 30 controls the discharging of the FC 4 and the charging and discharging of the BAT 8. The power control system 30 includes a fuel cell DC/DC converter (hereinafter, referred to as FDC) 32, a battery DC/DC converter (hereinafter, referred to as BDC) 34, a motor inverter (hereinafter, referred to as MINV) 38, and an auxiliary inverter (hereinafter referred to as AINV) 39. The FDC 32 controls output current of the FC 4 in accordance with a required current value sent from the ECU 3, adjusts DC power from the FC 4, and outputs the adjusted DC power to the MINV 38 or the AINV 39. The BDC 34 adjusts the DC power from the BAT 8 and outputs the DC power to the MINV 38 or the AINV 39. The BAT 8 is capable of charging the power generated by the FC 4. The MINV 38 converts the input DC power into three-phase AC power and supplies the three-phase AC power to the motor 50. The motor 50 drives the wheels 5 to travel the vehicle. The power of the FC 4 and BAT 8 is capable of being supplied to load devices other than the motor 50 via the AINV 39. Herein, the load devices include auxiliary devices for the FC 4 and for the vehicle. The auxiliary devices for the FC 4 include the air compressor 14, the three-way valve 15, the back pressure valve 17, the tank valve 24, the pressure regulating valve 25, the INJ 26, and the drain valve 28 described above. The auxiliary devices for the vehicle include, for example, an air conditioner, lighting devices, hazard lamps, and the like. Additionally, the FC 4 or the BAT 8 may be directly connected to the MINV 38 without providing the BDC 34 or the FDC 32.

The ECU 3 includes a central processing unit (CPU), a read only memory (ROM), and a random access memory (RAM). The ECU 3 is electrically connected to the accelerator opening degree sensor 6, the air compressor 14, the three-way valve 15, the back pressure valve 17, the tank valve 24, the pressure regulating valve 25, the INJ 26, the drain valve 28, the FDC 32, the BDC 34, and the pressure sensor S.

The ECU 3 calculates required output power for the FC 4 on the basis of the detection value of the accelerator opening degree sensor 6, the driving state of the above-described auxiliary devices for the vehicle and for the FC 4, the stored power of the BAT 8, and the like. On the basis of the required output power, the ECU 3 calculates a required current value for the FC 4. Further, in response to the required output power for the FC 4, the ECU 3 controls the air compressor 14 and the INJ 26 to adjust the flow rates of the cathode gas and the anode gas to be supplied to the FC 4, and the ECU 3 controls the FDC 32 in response to the required current value. In this manner, the output current of the FC 4 is controlled. The ECU 3 is an example of a controller that controls the INJ 26.

Herein, water generated in the cathode flow path 4c by the power generation reaction of the FC 4, nitrogen contained in the cathode gas, and the like might permeate the electrolyte membrane, which might generate liquid water and impurities in the anode flow path 4a. The ECU 3 performs a pulsating operation for pulsating the pressure of the anode gas to be supplied to the FC 4 in order to accelerate discharge of liquid water and impurities from the anode flow path 4a. Before describing the pulsating operation in the present embodiment, a pulsating operation of a comparative example will be described.

[Pulsating Operation of Comparative Example]

Figure 2:
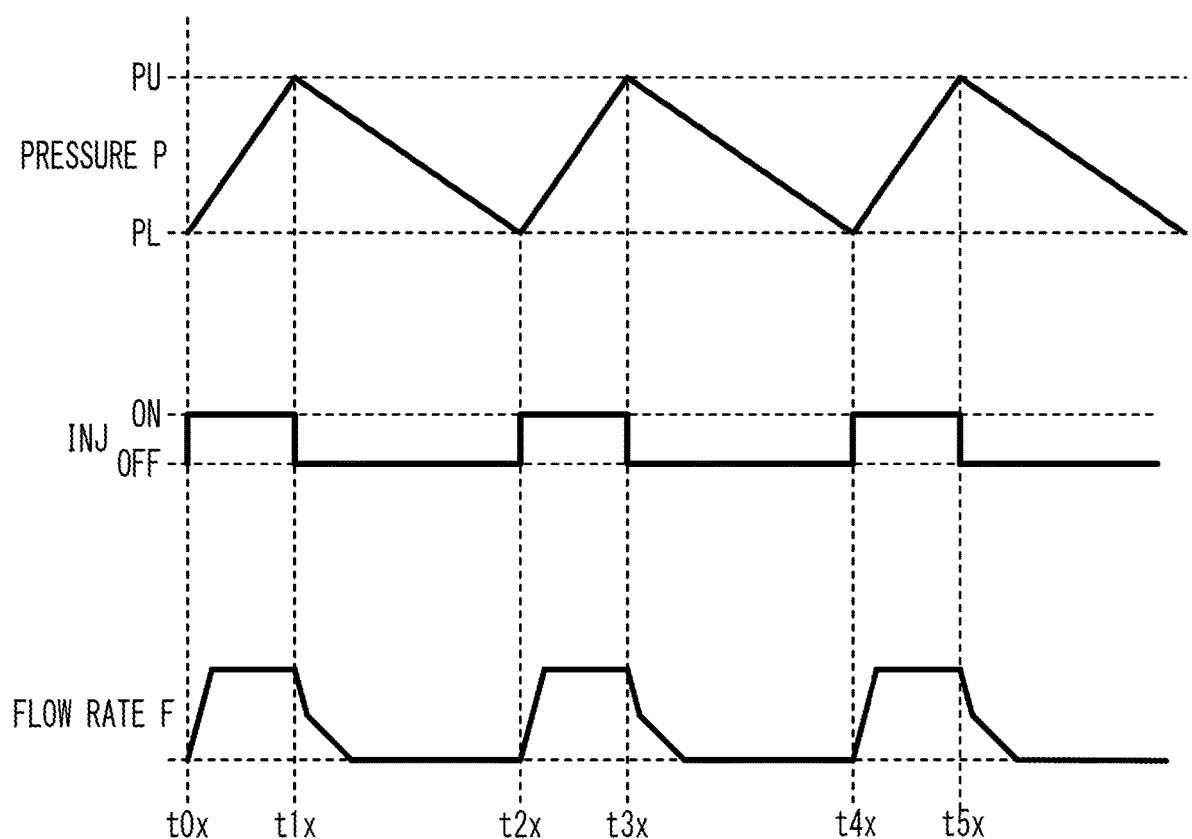
FIG. 2 is a timing chart of a pulsating operation of a comparative example.

FIG. 2 is a timing chart of the pulsating operation of the comparative example. FIG. 2 illustrates a pressure P of the anode gas to be supplied to the FC 4, an energization state of the INJ 26, and a flow rate F of the anode gas flowing into the anode flow path 4a of the FC 4. The flow rate F is the sum of the flow rate of the anode gas injected from the INS 26, and the flow rate of the anode gas discharged from the FC 4 and circulated again to the FC 4 through the circulation pipe 23 and the EJ 29.

At time t0x when the pressure P detected by the pressure sensor S is equal to or lower than a pressure lower limit PL, the ECU 3 switches the INS 26 from OFF state to ON state. Thus, the anode gas is injected from the NJ 26 and then is supplied to the FC 4 through the EJ 29, and then the anode gas discharged from the FC 4 is supplied to the FC 4 through the circulation pipe 23 and the EJ 29. During the period when the INJ 26 injects the anode gas, the pressure P increases, and the flow rate F increases to a predetermined value and thereafter becomes substantially constant. The reason why the pressure P increases during the period when the INJ 26 injects the anode gas is that an amount of the anode gas injected from the INS 26 is larger than the anode gas consumed by the power generation of the FC 4 during this period.

At time t1x when the pressure P becomes equal to or higher than a pressure upper limit value PU, the ECU 3 switches the INJ 26 from ON state to OFF state. Thus, the INS 26 stops injecting the anode gas, and then the pressure P and the flow rate F start to decrease, and the flow rate F becomes substantially zero. The reason why the pressure P decreases during the period when the injection of the anode gas is stopped is that the anode gas is consumed by the power generation in the FC 4 even during the period when the injection is stopped.

At time t2x when the pressure P is equal to or lower than the pressure lower limit value PL again, the INJ 26 starts injecting the anode gas. At time t3x when the pressure P is equal to or higher than the pressure upper limit value PU, the INJ 26 stops injecting the anode gas. Likewise, the INS 26 starts injecting the anode gas at time t4x, and the INS 26 stops injecting the anode gas at time t5x. Thus, the pressure P pulsates in the range between the pressure upper limit value PU and the pressure lower limit value PL. In the comparative example, the period from the time t0x to t1x, the period from the time t2x to 3x, and the period from the time t4x to t5x correspond to the pressure-increasing period in which the pressure P increases. The period from the time tix to t2x and the period from the time 3x to 4x correspond to a pressure-decreasing period in which the pressure P decreases.

As described above, in the comparative example, the flow rate F gradually decreases to substantially zero in the pressure-decreasing period. In this manner, in the pressure-decreasing period, the anode gas does not tend to flow in the anode flow path 4a of the FC 4. As a result, liquid water and impurities might remain at positions in the anode flow path 4a, and the anode gas might not be supplied on a part of the anode catalyst layer of the membrane electrode assembly. Accordingly, the power generation reaction might be hardly generated on a part of the membrane electrode assembly, which might degrade the power generation efficiency of the FC 4.

[Pulsating Operation of Present Embodiment]

In the present embodiment, an intermittent injection pulsating operation and a normal pulsating operation are performed. The normal pulsating operation will be described later, and the intermittent injection pulsating operation will be described first.

[Intermittent Injection Pulsating Operation]

FIG. 3 is a timing chart of the intermittent injection pulsating operation in the present embodiment. Like FIG. 2, FIG. 3 illustrates the anode gas pressure P, the energization state of the INJ 26, and the anode gas flow rate F. Like the comparative example, in the intermittent injection pulsating operation in the present embodiment, at time t0 when the pressure P is equal to or lower than the lower pressure limit PL, the INJ 26 starts injecting the anode gas, and at time t1 when the pressure P is equal to or higher than the upper pressure limit PU, the INJ26 stops injecting the anode gas. Likewise, after that, at time t2 when the pressure P is equal to or lower than the pressure lower limit value PL, the INJ 26 stats injecting the anode gas, and at time t3 when the pressure P is equal to or higher than the pressure upper limit PU, the NJ 26 stops injecting the anode gas.

Herein, in the present embodiment, in the pressure-decreasing period from time t1 to t2, the ECU 3 controls the INJ 26 to intermittently inject the anode gas. In the intermittent injection in the pressure-decreasing period, an injection period in which the NJ 26 injects the anode gas and a pause period in which the INJ 26 temporally stops injecting the anode gas are alternately repeated at a substantially constant cycle. During the injection period, the pressure P and the flow rate F temporarily increase. During the pause period, the pressure P and the flow rate F decrease. In this manner, the anode gas flows through the anode flow path 4a of the FC 4 even in the pressure-decreasing period, which suppresses liquid water and impurities from remaining at the same position in the anode flow path 4a. As a result, the anode gas is supplied to the entire surface of the membrane electrode assembly of the FC 4, which suppresses a decrease in power generation efficiency of the FC 4. Additionally, since the fuel cell system 1 includes the EJ 29, the EJ 29 sucks the anode gas discharged from the FC 4, even if the injection period per one time in the intermittent injection in the pressure-decreasing period is short. It is thus possible to ensure the fluidity of the anode gas in the anode flow path 4a.

FIG. 3 illustrates Δt indicating the pause period in intermittent injection in the pressure-decreasing period. Δt might be 0.5 seconds or less, or 0.1 seconds or less. In this period, the anode gas flows by inertia in the anode flow path 4a even in the pause period after the injection, which suppresses liquid water and impurities from remaining at the same position in the anode flow path 4a. In addition, this pause period may be shorter as the pressure loss of the anode gas in the anode flow path 4a is larger, because it is difficult to ensure the fluidity of the anode gas in the pause period if the pressure loss of the anode gas is large. However, in consideration of the response performance of the INJ 26, the pause period and the injection period may be suitably set.

As described above, the pressure P temporarily increases during the injection period due to the intermittent injection of the INJ 26, so that the flow rate F also temporarily increases. Since the INJ 26 injects the anode gas such that the flow rate F temporarily increases, the anode gas flows by inertia even immediately after the injection is stopped. This also suppresses liquid water and impurities from remaining at the same position in the anode flow path 4a, thereby suppressing the decrease in the power generation efficiency of the FC 4.

The injection amount due to the intermittent injection in the pressure-decreasing period is set to such an extent that the pressure P gradually decreases toward the pressure lower limit value PL. Specifically, the total injection amount of the anode gas injected from the INJ 26 in the pressure-decreasing period is set to be smaller than the consumption amount of the anode gas consumed by the FC 4 in the pressure-decreasing period. Thereby, the pressure P decreases to the pressure lower limit value PL in the pressure-decreasing period, which causes the pressure P to pulsate between the pressure upper limit value PU and the pressure lower limit value PL. The pulsation of the pressure P between the pressure upper limit value PU and the pressure lower limit value PL accelerates discharging liquid water and impurities from the anode flow path 4a.

In the example of FIG. 3, in the intermittent injection in the pressure-decreasing period, one injection period is shorter than one pause period, but is not limited thereto, and one injection period may be longer than one pause period. Further, one injection period of the intermittent injection in the pressure-decreasing period is set shorter than the injection period in the pressure-increasing period.

The pressure P in the pressure-decreasing period may be controlled as follows. In the pressure-decreasing period, a target pressure value is set to gradually decrease from the pressure upper limit value PU to the pressure lower limit value PL with a lapse of time, and the anode gas is intermittently injected such that the pressure P converges to the target pressure value. For example, when the INJ 26 injects the anode gas and then the pressure P is equal to or higher than the target pressure value, the INJ 26 stops injecting the anode gas for a predetermined target pause period. When the pause period passes the target pause period, the INJ 26 starts injecting the anode gas again. When the pressure P is equal to or higher than the target pressure value, the INJ 26 stops injecting the anode gas again for the target pause period. Such control may be performed such that the pressure P gradually decreases in the pressure-decreasing period. Alternately, a target injection period and the target pause period may be set beforehand based on experimental results and the like such that the pressure P gradually decreases in the pressure-decreasing period, and the intermittent injection may be performed based on the target injection period and the target pause period. For example, the target injection period and the target pause period may be set such that an increasing amount of the pressure P due to one injection is smaller than a decreasing amount of the pressure P in the pause period.

[Anode Gas Injection Control]

Figure 4A:
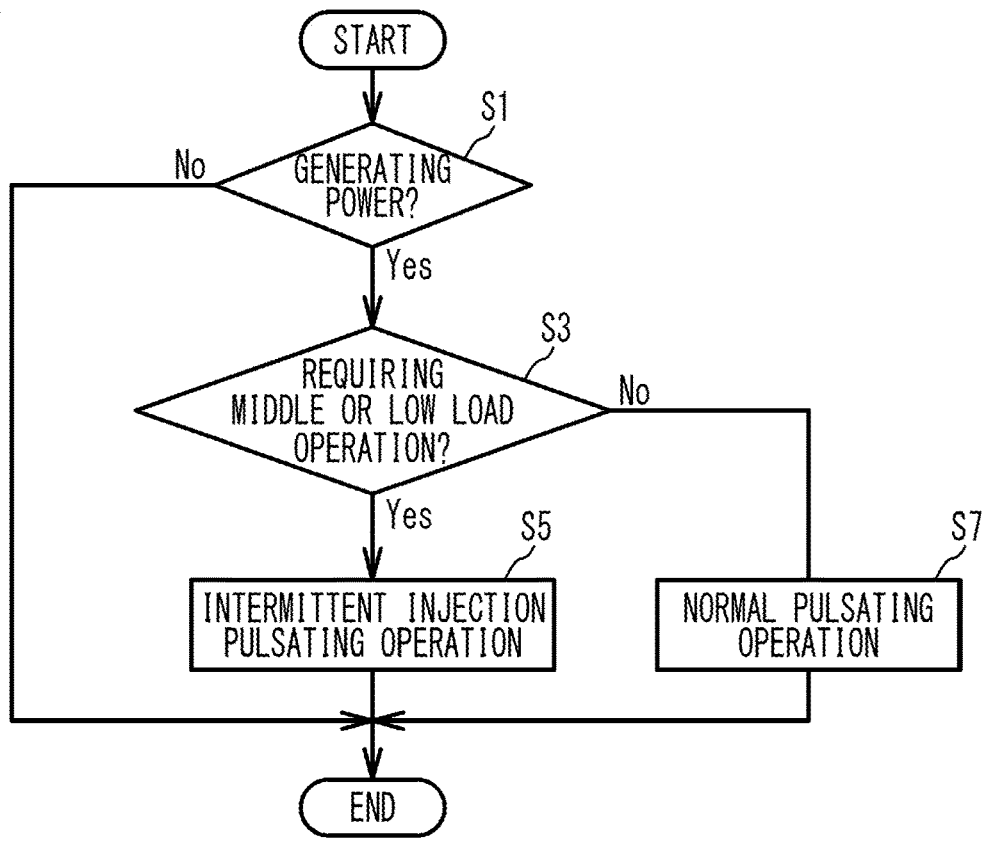
FIG. 4A is a flowchart illustrating an example of anode gas injection control.

FIG. 4A is a flowchart illustrating an example of anode gas injection control. The ECU 3 determines whether or not the FC 4 generates power (step S1). For example, the ECU 3 may determine that the power generation is performed when an output current value of the FC 4 detected by a current sensor (not illustrated) is greater than zero, and may determine that the power generation is stopped when the output current value is zero. Further, the ECU 3 may determine that the power generation is performed when required power to the FC 4 is equal to or higher than a predetermined threshold value for starting the power generation, and may determine that the power generation is stopped when the required power is lower than the predetermined threshold value. If No is determined in step S1, this control ends.

If Yes is determined in step S1, the ECU 3 determines whether or not a middle or low load operation is required of the FC 4 (step S3). If Yes is determined in step S3, the ECU 3 performs the intermittent injection pulsating operation (step S5). If No is determined in step S3, the ECU 3 performs the normal pulsating operation (step S7). That is, when a high load operation is required of the FC 4, the normal pulsating operation is performed without performing the intermittent injection pulsating operation. The normal pulsating operation will be described later.

Figure 4B:
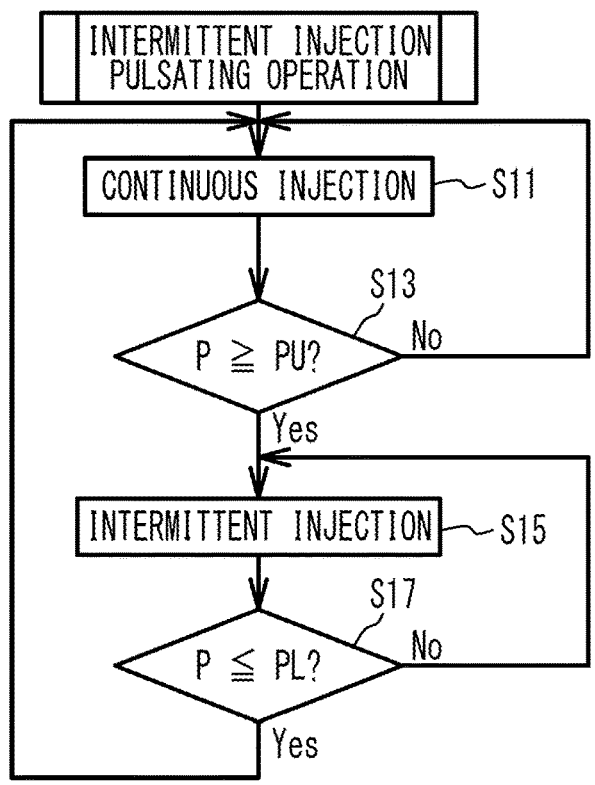
FIG. 4B is a flowchart illustrating an example of the intermittent injection pulsating operation.

FIG. 4B is a flowchart illustrating an example of the intermittent injection pulsating operation. The ECU 3 energizes the solenoid of the INJ 26 to continuously inject the anode gas (step S11). Next, the ECU 3 determines whether or not the pressure P is equal to or higher than the pressure upper limit value PU on the basis of the detection result of the pressure sensor S (Step S13). If No is determined in step S13, the process in step S11 is continued. If Yes is determined in step S13, the ECU 3 controls the INJ 26 to intermittently inject the anode gas (step S15). In the intermittent injection, the energization state and the non-energization state of the solenoid of the INJ 26 are alternately repeated. In the intermittent injection in which the injection and the injection pause are repeated, the energization period and the non-energization period of the solenoid are set such that the injection amount of the anode gas in the injection period is lower than the consumption amount of the anode gas consumed by the FC 4 in the injection period and the pause period. Next, the ECU 3 determines whether or not the pressure P is equal to or lower than the lower pressure limit PL (step S17). If No is determined in step S17, the process in step S15 is continued. If Yes is determined in step S17, the process in step S11 is performed.

Next, the normal pulsating operation will be described. Like the comparative example illustrated in FIG. 2, in the normal pulsating operation, the injection of the anode gas is not performed in the pressure-decreasing period. The consumption amount of the anode gas consumed by the FC 4 is large and the decreasing speed of the pressure P under the state where the injection of the anode gas is stopped is high in the high load operation of the FC 4, as compared to the medium and low load operations of the FC 4. For this reason, in order to maintain the pressure P at a higher pressure in the high load operation as compared to the medium and low load operations, the pressure lower limit value PL is set to high, which reduces the magnitude of the amplitude of the pressure P defined by the pressure upper limit value PU and the pressure lower limit value PL. Thus, even when the pressure P is equal to or higher than the upper pressure limit PU and the injection of the anode gas is stopped in the high load operation, the pressure P decreases to the pressure equal to or lower than the lower limit PL in a relatively short time and the injection of the anode gas is performed again. Therefore, the pressure-decreasing period is short in the high-load operation, as compared to the medium and low load operations. It might be difficult to perform the above-described intermittent injection in the short pressure-decreasing period in consideration of controllability of the INJ 26. In addition, since the pressure-decreasing period is short in the high load operation, even during the period when the INJ 26 stops injecting the anode gas in the pressure-decreasing period, it is possible to ensure the ratio of the period when the anode gas flows by inertia in the anode flow path 4a to the pressure-decreasing period. Additionally, since the anode gas having a high flow rate always flows in the anode flow path 4a in the high load operation, liquid water and impurities does not tend to remain in the same position in the anode flow path 4a. Accordingly, the injection of the anode gas is not performed in the pressure-decreasing period in the high load operation. Note that the above description is not intended to necessarily not perform the intermittent injection in the pressure-decreasing period in the high load operation. In a case where the INJ 26 has a high responsiveness or where the pressure-decreasing period is set to such an extent that the INJ 26 is capable of injecting the anode gas at least once in the pressure-decreasing period, the intermittent injection may be performed in the pressure-decreasing period in the high load operation.

In the present embodiment, in the intermittent injection pulsating operation, the INJ 26 intermittently injects the anode gas over the pressure-decreasing period. However, the present disclosure is not limited to this, and the INJ 26 may inject the anode gas at least once in the pressure-decreasing period. Further, the injection may be performed intermittently in a part of the pressure-decreasing period. For example, since the continuous injection is performed by the INJ 26 in the pressure-increasing period, the anode gas may still flow in the anode flow path 4a immediately after switching from the pressure-increasing period to the pressure-decreasing period. Thus, the injection may be intermittently performed from the middle of the pressure-decreasing period to the end thereof. In addition, within the pressure-decreasing period, the intermittent injection may be performed for a predetermined period, and then the intermittent injection may be stopped, after that, the intermittent injection may be performed again.

Herein, the pressure upper limit value PU is set based on an allowable pressure of the electrolyte membrane of the FC 4, and is substantially constant regardless of the magnitude of the required load on the FC 4. On the other hand, the pressure lower limit value PL is set to decrease as the required load on the FC 4 decreases. This is because the amount of the anode gas consumed by the FC 4 decreases, as the required load on the FC 4 decreases. Thus, the magnitude of the amplitude of the pressure P defined by the pressure upper limit value PU and the pressure lower limit value PL increases, as the required load on the FC 4 decreases. An increase in the amplitude lengthens the pressure-decreasing period during which the intermittent injection is not performed. For this reason, the number of times of the intermittent injection in the pressure-decreasing period in the intermittent injection pulsating operation may increase, as the required load on the FC 4 decreases. It is thus possible to ensure the fluidity of the anode gas in the anode flow path 4a during the pressure-decreasing period even in the long pressure-decreasing period.

[First Variation]

Figure 5:
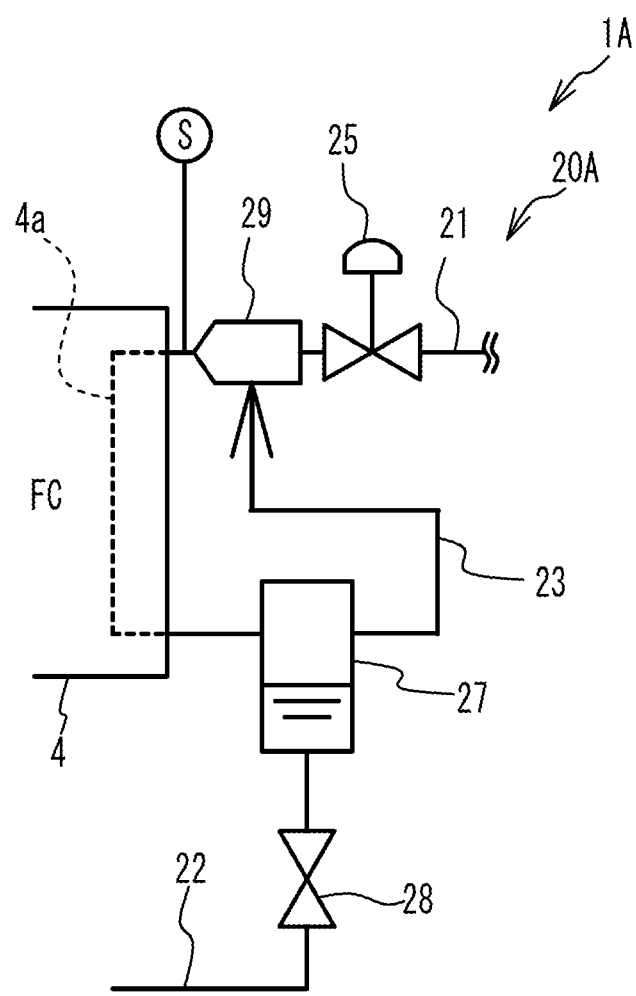
FIG. 5 is a schematic configuration view of an anode gas supply system of a fuel cell system according to a first variation.

FIG. 5 is a schematic configuration view of an anode gas supply system 20A of a fuel cell system 1A according to a first variation. In addition, the same components as those of the above-described embodiment are denoted by the same reference numerals, and duplicated description will be omitted. Components not illustrated in FIG. 5 are the same as the components described above. In the first variation, the INJ 26 is not provided, and the ECU 3 controls an opening degree of the pressure regulating valve 25 to control the injection amount of the anode gas therefrom. The pressure regulating valve 25 is a butterfly valve serving as an electric valve driven by a DC motor. The ECU 3 controls the DC motor to maintain the opening degree of the pressure regulating valve 25 at an arbitrary opening degree. Further, the injection flow rate of the anode gas injected from the pressure regulating valve 25 increases, as the opening degree of the pressure regulating valve 25 increases. In the first variation, the pressure regulating valve 25 is an example of an injection device. In the first variation, a continuous injection pulsating operation is performed instead of the above-described intermittent injection pulsating operation.

Figure 6:
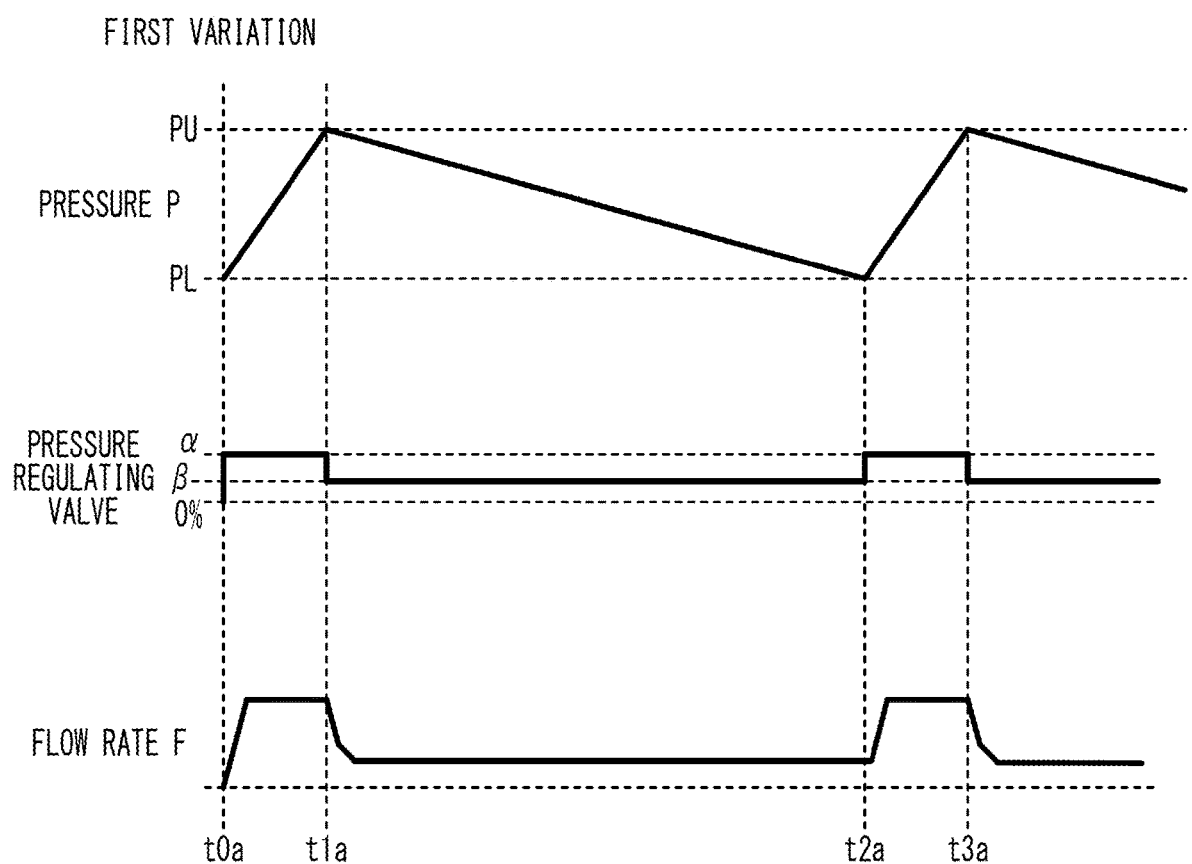
FIG. 6 is a timing chart of a continuous injection pulsating operation in the first variation.

FIG. 6 is a timing chart of the continuous injection pulsating operation in the first variation. During the pressure-increasing periods from time t0a to t1a and from time t2a to t3a, the opening degree of the pressure regulating valve 25 is maintained at an opening degree α which is a relatively large value. The opening degree α of the pressure regulating valve 25 in the pressure-increasing period is controlled such that the injection amount of the anode gas from the pressure regulating valve 25 is larger than the consumption amount of the anode gas consumed by the FC 4. In the pressure-decreasing period from the time t1a to the time t2a, the opening degree of the pressure regulating valve 25 is maintained at an opening degree β which is larger than zero and smaller than the opening degree α of the pressure regulating valve 25 in the pressure-increasing period. The opening degree β of the pressure regulating valve 25 in the pressure-decreasing period is set such that the injection amount of the anode gas from the pressure regulating valve 25 is smaller than the consumption amount of the anode gas consumed by the FC 4. Thus, the anode gas is continuously injected from the pressure regulating valve 25 while the pressure P gradually decreases in the pressure-decreasing period. Therefore, the anode gas always flows in the anode flow path 4a of the FC 4 even in the pressure-decreasing period, and it is possible to suppress liquid water and impurities from remaining in the same position in the anode flow path 4a. Further, the pressure P gradually decreases in the pressure-decreasing period, so that the pressure-increasing period and the pressure-decreasing period is alternately repeated, whereby the pressure P pulsates between the pressure lower limit value PL and the pressure upper limit value PU. This pulsation accelerates discharging liquid water and impurities from the anode flow path 4a.

Figure 7A:
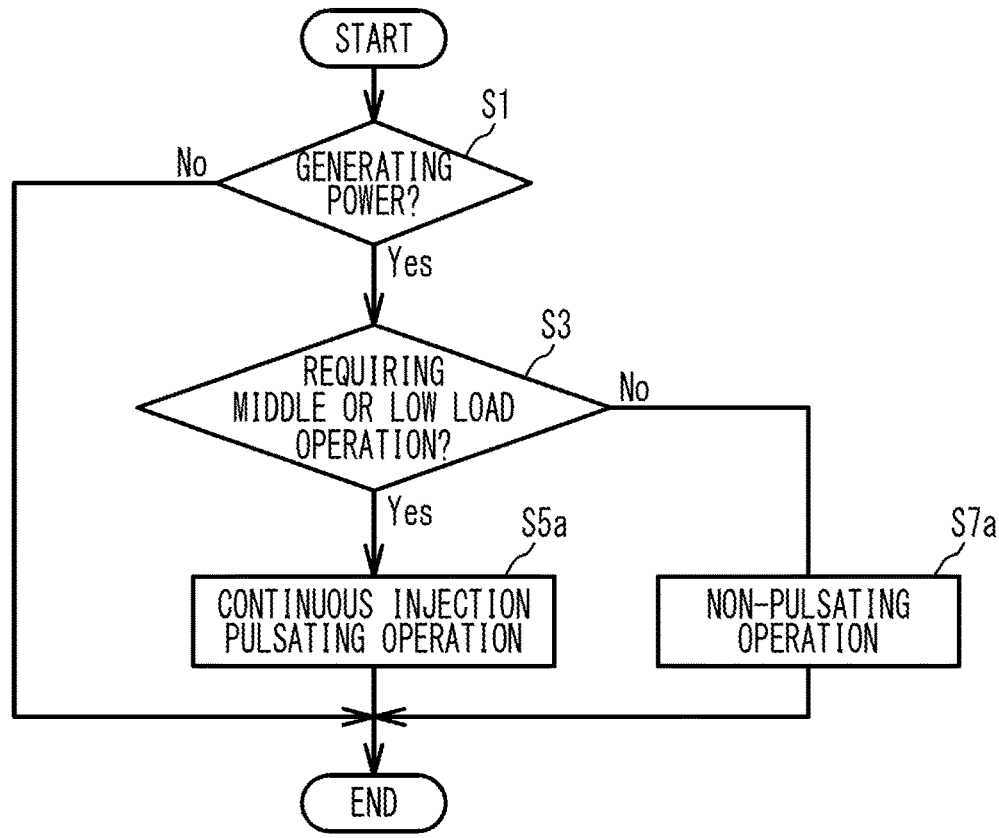
FIG. 7A is a flowchart illustrating an example of anode gas injection control in the first variation.

FIG. 7A is a flowchart illustrating an example of the anode gas injection control in the first variation. If Yes is determined in step S3, the ECU 3 performs the continuous injection pulsating operation (Step S5a). If No is determined in step S3, the ECU 3 performs a non-pulsating operation (Step S7a). The non-pulsating operation will be described later.

Figure 7B:
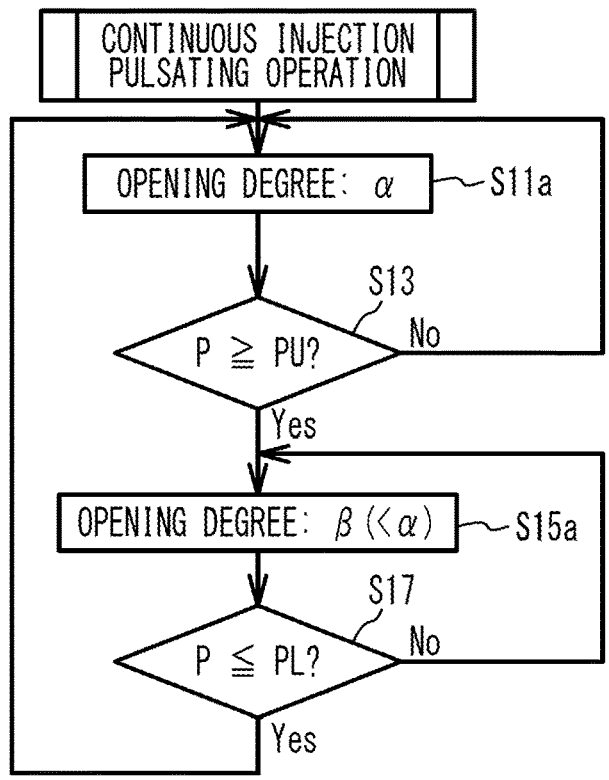
FIG. 7B is a flowchart illustrating an example of the continuous injection pulsating operation.

FIG. 7B is a flowchart illustrating an example of the continuous injection pulsating operation. The ECU 3 controls the opening degree of the pressure regulating valve 25 to be the opening degree α (step S11a). The opening degree α is an opening degree at which the injection amount of the anode gas from the pressure regulating valve 25 is larger than the consumption amount of the anode gas consumed by the FC 4. The opening degree α may be a fixed value, or may be set to be larger as the required load on the FC 4 is greater in the middle and low load operations. If Yes is determined in step S13, the ECU 3 controls the opening degree of the pressure regulating valve 25 to be the opening degree β (step S15a). Also, the opening degree β is not limited to a fixed value. If Yes is determined in step S17, the process in step S11a is performed. If No is determined in step S17, the process in step S15a is continued.

In the non-pulsating operation, the anode gas is always injected at a high flow rate while the opening degree of the pressure regulating valve 25 is maintained at a large degree. In this case, the opening degree of the pressure regulating valve 25 is kept constant such that the injection amount of the anode gas injected from the pressure regulating valve 25 is the same as the consumption amount of the anode gas consumed by the FC 4. Thus, unlike the pulsating operation described above, the pressure P does not pulsate due to the magnitude relationship between the consumption amount and the injection amount of the anode gas.

In the continuous injection pulsating operation in the first variation, the pressure regulating valve 25 is maintained at the predetermined opening degree to continuously inject the anode gas over the pressure-decreasing period, but is not limited thereto. For example, the opening degree of the pressure regulating valve 25 is alternately set to a first predetermined value and a second predetermined value such that the pressure P gradually decreases without exceeding the pressure upper limit value PU in the pressure-decreasing period. The second predetermined value is smaller than the first predetermined value and not zero. In this case, the second predetermined value is set to such an extent that the pressure P decreases, in a case where the opening degree is maintained at the second predetermined value. However, the first predetermined value may be set to such an extent that the pressure P decreases, increases, or is maintained constant, in a case where the opening degree is maintained at the first predetermined value. For example, in a case where the pressure P increases during the period in which the opening degree of the pressure regulating valve 25 is maintained at the first predetermined value, in consideration of making the increasing amount of the pressure P, during the period in which the opening degree of the pressure regulating valve 25 is maintained at the first predetermined value, smaller than the decreasing amount of the pressure P, during the period in which the opening degree of the pressure regulating valve 25 is maintained at the second predetermined value, both periods are needed to be set. In this manner, the opening degree of the pressure regulating valve 25 is controlled such that the pressure P temporarily increases in the pressure-decreasing period. It is thus possible to suppress liquid water and impurities from remaining in the same position in the anode flow path 4a in the pressure-decreasing period.

In the pressure-decreasing period, the anode gas may be injected by closing and opening the pressure regulating valve 25 at least once. Further, like the present embodiment described above, the intermittent injection may be performed by opening and closing the pressure regulating valves 25 several times in the pressure-decreasing period. In performing the intermittent injection, the opening degree of the pressure regulating valve 25 may be controlled such that the pressure P temporarily increases in the injection period.

[Second Variation]

Figure 8A:
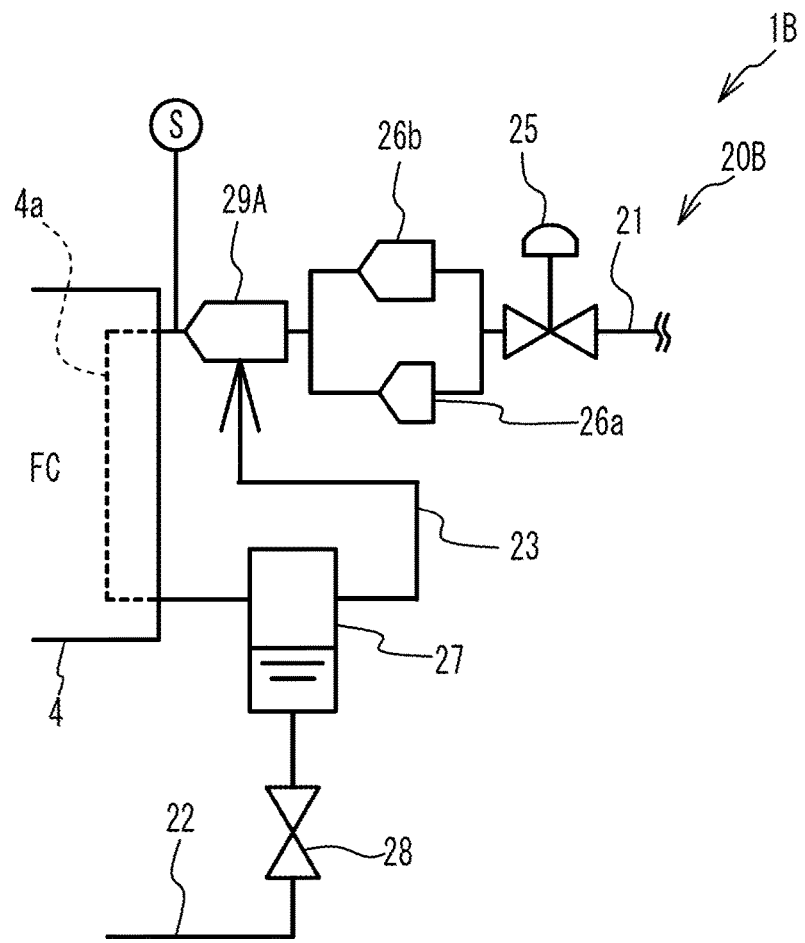
FIG. 8A is a schematic configuration view of an anode gas supply system of a fuel cell system according to a second variation.

FIG. 8A is a schematic configuration view of an anode gas supply system 20B of a fuel cell system 1B according to a second variation. The anode gas supply system 20B includes a small flow rate injector (hereinafter, referred to as SNJ) 26a, a large flow rate injector (hereinafter, referred to as LINJ) 26b, and a multi-nozzle ejector (hereinafter, referred to as MEJ) 29A. The pressure regulating valve 25, the SINJ 26a and the LINJ 26b, and the MEJ 29A are arranged in this order from the upstream side in the supply pipe 21. The SINJ 26a and the LINJ 26b are respectively provided at portions of the supply pipe 21 that are partially branched from each other. The anode gas injected from one of the SINJ 26a and the LINJ 26b flows through the MEJ 29A and is supplied to the FC 4. The MEJ 29A is an example of an ejector mechanism.

The SINJ 26a and the LINJ 26b each have the same structure as the INT 26 described above. However, a diameter of the injection hole of the LINJ 26b is larger than a diameter of the injection hole of the SINJ 26a. Under the same conditions of the injection period, the injection flow rate of the anode gas from the LINJ 26b is higher than the injection flow rate of the anode gas from the SINJ 26a. The injection flow rate of the anode gas is the amount of the anode gas injected from each injector per unit time. The SINJ 26a is an example of a first injection device, and the LINJ 26b is an example of a second injection device. The SINJ 26a and the LINJ 26b are electrically connected to the ECU 3.

Figure 8B:
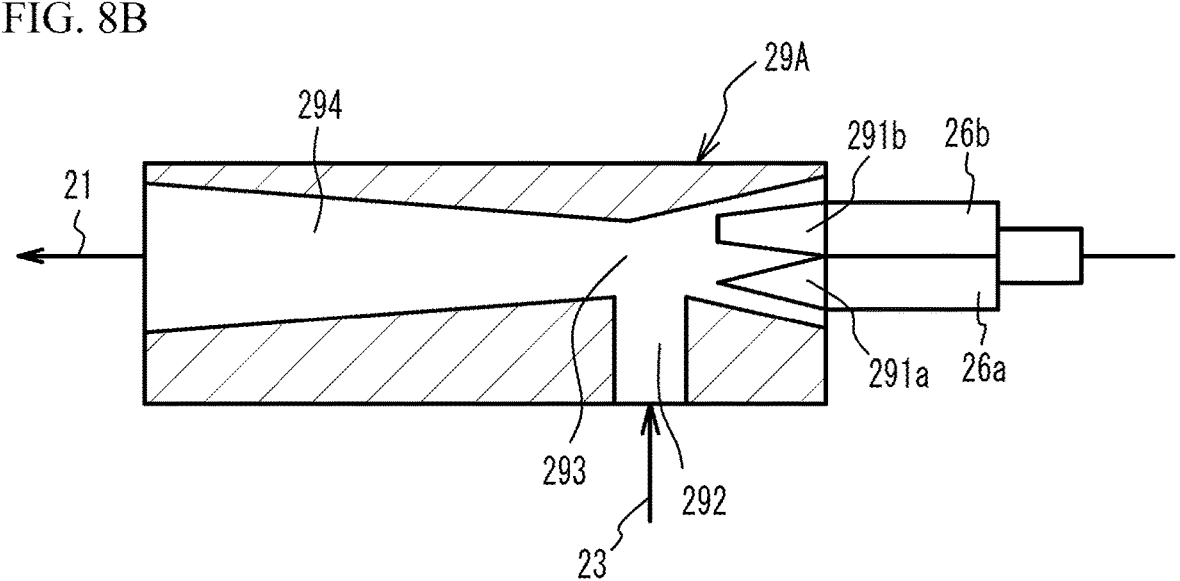
FIG. 8B is a schematic configuration view of a multi-nozzle ejector.

FIG. 8B is a schematic configuration view of the MEJ 29A. The MEJ 29A includes nozzle portions 291a and 291b, a suction portion 292, a mixing portion 293, and a diffuser portion 294. The nozzle portions 291a and 291b are respectively connected to the SINS 26a and the LINJ 26b. A diameter of the nozzle portion 291b is larger than that of the nozzle portion 291a. The circulation pipe 23 is connected to the suction portion 292. The anode gases respectively injected from the SINJ 26a and the LINJ 26b flow through the MEJ 29A through the nozzle portions 291a and 291b, so that the anode gas discharged from the FC 4 is sucked into the suction portion 292. In the mixing portion 293, the anode gas injected from any of the SINJ 26a and the LINJ 26b is mixed with the anode gas discharged from the FC 4. In the diffuser portion 294, the anode gas mixed in the mixing portion 293 flows. The diffuser portion 294 is formed such that its diameter gradually increases toward the downstream side. While the anode gas newly injected and the anode gas discharged from the FC 4 are mixed in the mixing portion 293 and the mixed anode gas flows through the diffuser portion 294, the hydrogen concentration becomes uniform. Thus, the anode gas having a uniform hydrogen concentration is supplied to the FC 4.

Since the anode gas injected from not only the SINJ 26a but also the LINJ 26b flows through the MEJ 29A as described above, the anode gas discharged from the FC 4 is sucked into the MEJ 29A and is recirculated to the FC 4, even when the anode gas is injected from any of the SINS 26a and the LINJ 26b. Further, since the single MEJ 29A is shared by the SINS 26a and the LINJ 26b, the number of components is reduced, and the mounting space is also reduced, as compared with a case where ejectors are individually provided for the SINS 26a and LINJ 26b.

Figure 9:
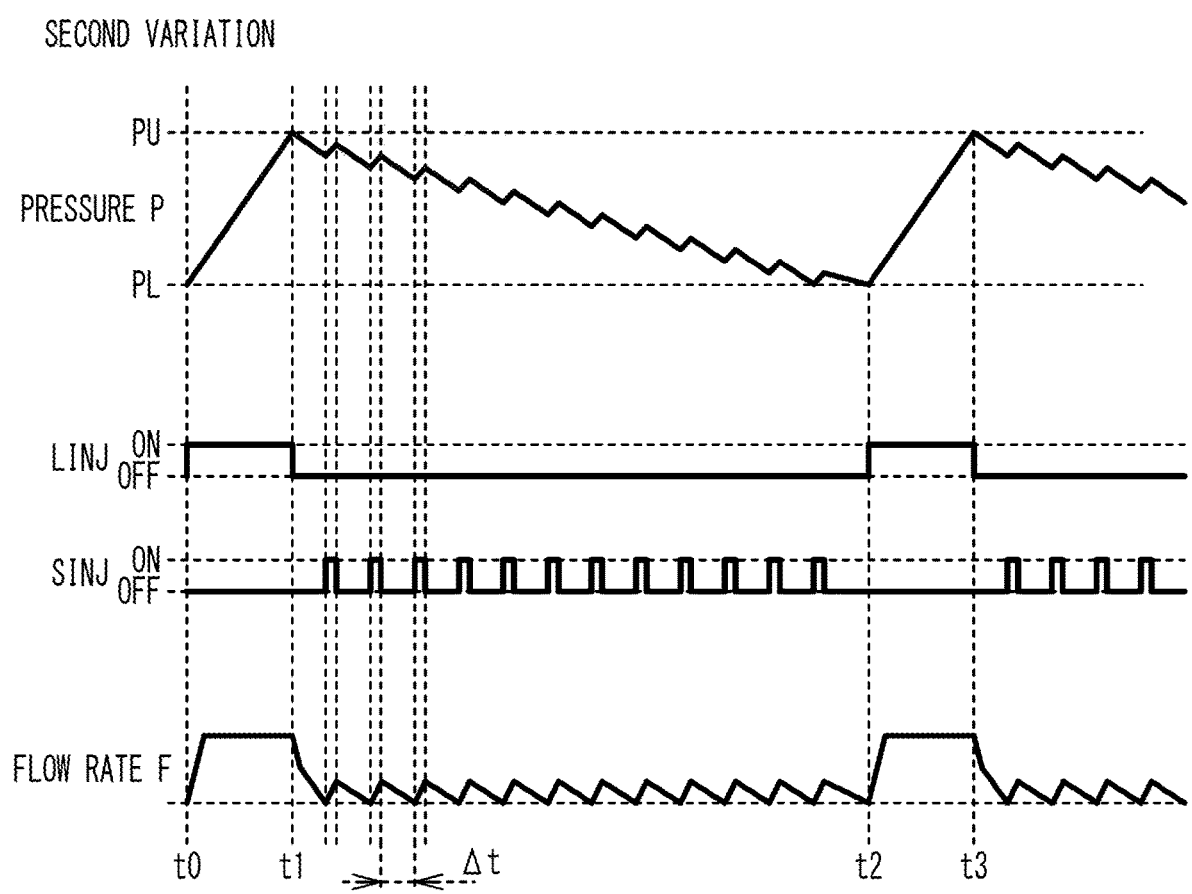
FIG. 9 is a timing chart of an intermittent injection pulsating operation in the second variation.

FIG. 9 is a timing chart of the intermittent injection pulsating operation in the second variation. In the pressure-increasing period, the anode gas is continuously injected by the LINJ 26b. In the pressure-decreasing period, the injection of the anode gas by the LINJ 26b is stopped, and the anode gas is intermittently injected by the SINJ 26a. The injection amount of the LINJ 26b in the pressure-increasing period is larger than the consumption amount of the anode gas consumed by the FC 4 in the pressure-increasing period. The injection amount of the SINS 26a in the pressure-decreasing period is smaller than the consumption amount of the anode gas consumed by the FC 4 in the pressure-decreasing period. In the pressure-increasing period, in order to supply the anode gas used for the power generation for the FC 4 and to accelerate discharging liquid water and impurities from the anode flow path 4a, it is suitable to use the LINJ 26b having a large injection flow rate. In contrast, in the pressure-decreasing period, the anode gas is intermittently injected in order to ensure the fluidity of the anode gas in the anode flow path 4a of the FC 4, it is suitable to use the SINJ 26a having a small injection flow rate.

Figure 10A:
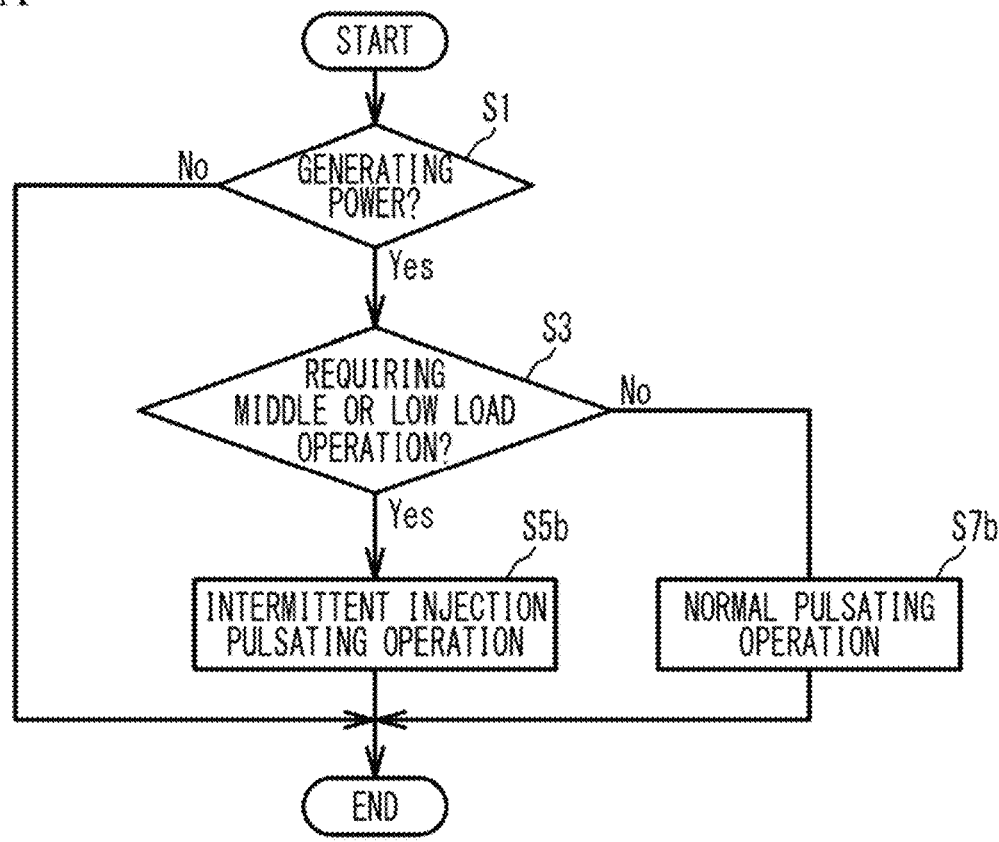
FIG. 10A is a flowchart illustrating an example of anode gas injection control in the second variation.

FIG. 10A is a flowchart illustrating an example of the anode gas injection control in the second variation. If Yes is determined in step S3, the ECU 3 performs the intermittent injection pulsating operation (step S5b). If No is determined in step S3, the ECU 3 performs the normal pulsating operation (step S7b). The normal pulsating operation in the second variation will be described later.

Figure 10B:
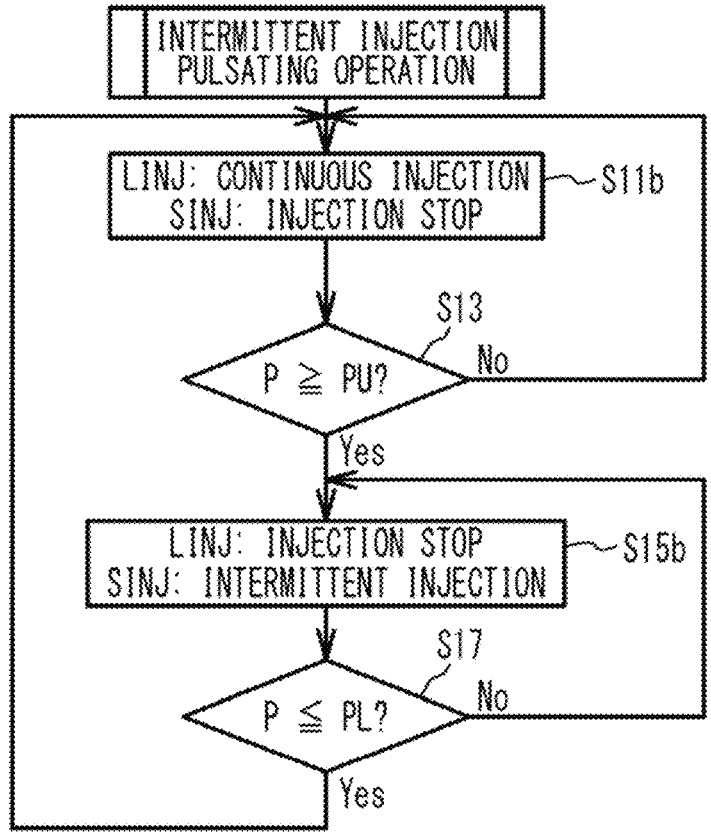
FIG. 10B is a flowchart illustrating an example of the intermittent injection pulsating operation in the second variation.

FIG. 10B is a flowchart illustrating an example of the intermittent injection pulsating operation in the second variation. The ECU 3 controls the LINJ 26b to continuously inject the anode gas, and controls the SINJ 26a to stop injecting the anode gas (step S11b). If No is determined in step S13, the process in step S11b is continued. If Yes is determined in step S13, the ECU 3 controls the LINJ 26b to stop injecting the anode gas, and controls the SINJ 26a to intermittently inject the anode gas (step S15b). If Yes is determined in step S17, the process in step S11b is performed. If No is determined in step S17, the process in step S15b is continued.

In the normal pulsating operation in the second variation, only the LINJ 26b may inject the anode gas and the SINJ 26a may stop injecting the anode gas, or the SINJ 26a and the LINJ 26b may inject anode gas.

In the intermittent injection pulsating operation in the second variation, only the LINJ 26b injects the anode gas in the pressure-increasing period. However, the SINJ 26a and the LINJ 26b may inject the anode gas. This causes the pressure of the anode gas to be supplied to the FC 4 to quickly increase in the pressure-increasing period, which accelerates discharging liquid water and impurities from the anode flow path 4a.

Instead of the intermittent injection pulsating operation in the second variation, the SINJ 26a may continuously inject the anode gas in the pressure-decreasing period, like the continuous injection pulsating operation in the first variation. In this case, the injection amount of the anode gas per unit time of the SINJ 26a is needed to be smaller than the consumption amount of the anode gas per unit time by the FC 4 such that the pressure P gradually decreases in the pressure-decreasing period.

[Third Variation]

Figure 11:
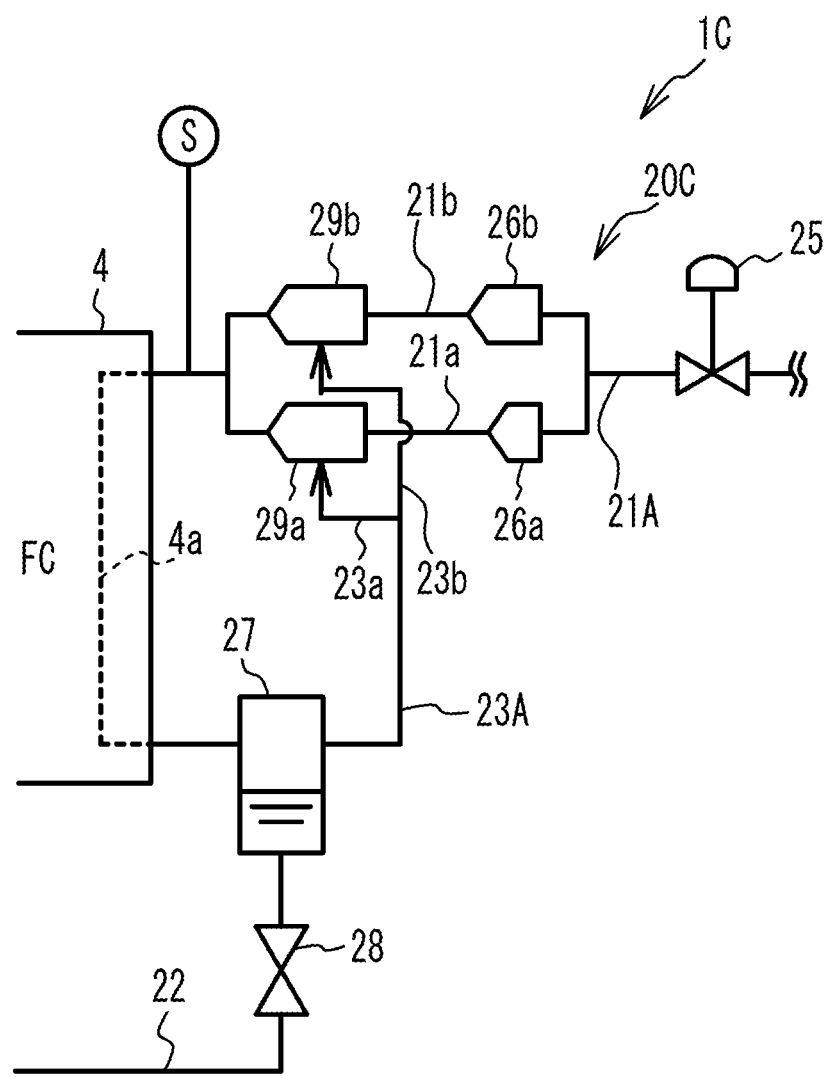
FIG. 11 is a schematic configuration view of an anode gas supply system of a fuel cell system according to a third variation.

FIG. 11 is a schematic configuration view of an anode gas supply system 20C of a fuel cell system IC according to a third variation. The fuel cell system IC is provided with ejectors (hereinafter, referred to as EJ) 29a and 29b through which the anode gases injected from the SINJ 26a and the LINJ 26b flow, respectively. That is, the anode gas injected from the SINS 26a flows only through the EJ 29a, and the anode gas injected from the LINJ 26b flows only through the EJ 29b. The SINS 26a and the EJ 29a and the LINJ 26b and the ES 29b are respectively provided in branch pipes 21a and 21b which are partially branched from each other in a supply pipe 21A. A circulation pipe 23A branches into branch pipes 23a and 23b at a downstream side with respect to the gas-liquid separator 27. The branch pipes 23a and 23b are respectively connected to EJs 29a and 29b. The EJs 29a and 29b are examples of an ejector mechanism.

Since the EJs 29a and 29b are respectively used exclusively for the SINJ 26a and the LINJ 26b, the specifications of the LINJ 26b may not be considered in designing the EJ 29a, and the specifications of the SINS 26a may not be considered in designing the EJ 29b. This ensures a degree of freedom in designs of the EJs 29a and 29b. For example, since the injection flow rate of the anode gas from the LINJ 26b is higher than that of the anode gas from the SINJ 26a, the EJ 29b may be designed to be larger than the EJ 29a.

Also in the third variation, like the second variation, in the intermittent injection pulsating operation, only the LINJ 26b continuously injects the anode gas in the pressure-increasing period, and only the SINJ 26a intermittently injects the anode gas in the pressure-decreasing period.

In the third variation, the SINS 26a and the LINJ 26b are provided. However, only the LINJ 26b may be used and the SINJ 26a may not be used. In this case, in the pressure-increasing period, the LINJ 26b may continuously inject the anode gas while the opening degree of the pressure regulating valve 25 is maintained at a relatively large, and the pressure regulating valve 25 may supply the anode gas to the FC 4 through the ES 29a. In the pressure-decreasing period, the pressure regulating valve 25 may supply the anode gas to the FC 4 through the EJ 29a while the opening degree of the pressure regulating valve 25 is maintained at a relatively small, and the LINT 26b may stop injecting the anode gas.

In the second and third variations, instead of the SINS 26a and the LINJ 26b, two pressure regulating valves may be used without using the pressure regulating valve 25. For example, the two pressure regulating valves may have a difference in the injection flow rate of the anode gas, even when the opening degree is the same. In this case, a pressure regulating valve having a small injection flow rate may be used instead of the SINJ 26a, and a pressure regulating valve having a large injection flow rate may be used instead of the LINJ 26b. In this case, in the pressure-increasing period, the anode gas may be injected from at least the pressure regulating valve having the large injection flow rate. In the pressure-decreasing period, the injection from the pressure regulating valve having the large injection flow rate may be stopped, and the opening degree of the pressure regulating valve having the small injection flow rate may be controlled in such a degree that the pressure P decreases, and then the anode gas may be injected from the pressure regulating valve having the small injection flow rate. Further, the two pressure regulating valves may have the same injection amount of the anode gas when the opening degrees are the same, but may have a difference in the maximum controllable opening degree. In this case, a pressure regulating valve having a small maximum opening degree may be used instead of the SINJ 26a, and a pressure regulating valve having a large maximum opening degree may be used instead of the LINJ 26b. In the pressure-increasing period, the anode gas may be injected from at least the pressure regulating valve having the large maximum opening degree. In the pressure-decreasing period, the injection from the pressure regulating valve having the large maximum opening degree may be stopped, and the opening degree of the pressure regulating valve having the small maximum opening degree may be controlled in such a degree that the pressure P decreases, and then the anode gas may be injected from the pressure regulating valve having the small maximum opening degree.

Although some embodiments of the present disclosure have been described in detail, the present disclosure is not limited to the specific embodiments but may be varied or changed within the scope of the present disclosure as claimed.

Finally, several aspects of the present disclosure are summarized as follows. According to an aspect of the present disclosure, there is provided a fuel cell system including: a fuel cell; an injection device configured to inject anode gas; an ejector mechanism through which the anode gas injected from the injection device flows; a circulation path configured to return the anode gas, discharged from the fuel cell, to the ejector mechanism; a supply path configured to supply the anode gas, discharged from the fuel cell together with the anode gas injected from the injection device from the ejector mechanism, to the fuel cell; and a controller configured to control the injection device to perform a pulsating operation in which a pressure-increasing period and a pressure-decreasing period are alternately repeated such that a pressure of the anode gas to be supplied to the fuel cell pulsates within a predetermined range, the pressure-increasing period being in which the pressure increases, the pressure-decreasing period being in which the pressure decreases, wherein the controller is configured to control the injection device to inject an amount of the anode gas larger than a consumption amount of the anode gas consumed by the fuel cell in the pressure-increasing period, and to control the injection device to inject an amount of the anode gas smaller than the consumption amount in the pressure-decreasing period.

With the above configuration, the anode gas is injected in the pressure-decreasing period, so that the anode gas discharged from the fuel cell together with the anode gas injected from the injection device are supplied from the ejector mechanism to the fuel cell. This suppresses a decrease in fluidity of the anode gas within the fuel cell in the pressure-decreasing period, and suppresses liquid water and impurities from remaining at positions in the fuel cell. Further, the injection device injects the anode gas having an injection amount larger than the consumption amount of the anode gas consumed by the fuel cell in the pressure-increasing period, and the injection device injects the anode gas having an injection amount smaller than the consumption amount in the pressure-decreasing period. It is therefore possible to maintain the pulsating operation in which the pressure of the anode gas repeatedly increases and decreases. This accelerates discharging liquid water and impurities from the fuel cell in the pressure-increasing period. In this manner, a decrease in the power generation efficiency of the fuel cell is suppressed.

The invention claimed is:

1. A fuel cell system comprising:
a fuel cell;
an injection device configured to inject anode gas;
an ejector mechanism through which the anode gas injected from the injection device flows;
a circulation path configured to return the anode gas, discharged from the fuel cell, to the ejector mechanism;
a supply path configured to supply the anode gas, discharged from the fuel cell together with the anode gas injected from the injection device from the ejector mechanism, to the fuel cell; and
a controller programmed to:
control the injection device to perform a pulsating operation in which a pressure-increasing period and a pressure-decreasing period are alternately repeated such that a pressure of the anode gas to be supplied to the fuel cell pulsates within a predetermined range, the pressure-increasing period being a period in which the pressure increases, the pressure-decreasing period being a period in which the pressure decreases, control the injection device to inject an amount of the anode gas larger than a consumption amount of the anode gas consumed by the fuel cell in the pressure-increasing period, and control the injection device to inject an amount of the anode gas smaller than the consumption amount of the anode gas consumed in the pressure-decreasing period.

2. The fuel cell system according to claim 1, wherein the controller is programmed to control the injection device to intermittently inject the anode gas in the pressure-decreasing period.

3. The fuel cell system according to claim 1, wherein
the injection device includes a valve,
the controller is programmed to control an opening degree of the valve,
an injection flow rate of the anode gas increases as the opening degree of the valve increases, and
the controller is programmed to maintain the opening degree of the valve smaller in the pressure-decreasing period than in the pressure-increasing period so as to control the injection device to continuously inject the anode gas in the pressure-decreasing period.

4. The fuel cell system according to claim 2, wherein the controller is programmed to control a period during which the injection of the anode gas is stopped to be 0.5 seconds or less in the pressure-decreasing period.

5. The fuel cell system according to claim 1, wherein the controller is programmed to control the injection device to inject the anode gas such that the pressure temporarily increases in the pressure-decreasing period.

6. The fuel cell system according to claim 1, wherein
the injection device includes first and second injection devices injecting the anode gas,
an injection flow rate of the anode gas of the second injection device is greater than an injection flow rate of the anode gas of the first injection device,
the controller is programmed to control at least the second injection device to inject the anode gas in the pressure-increasing period, and
the controller is programmed to control the first injection device to inject the anode gas and stop injection of the anode gas from the second injection device in the pressure-decreasing period.

7. The fuel cell system according to claim 6, wherein the ejector mechanism includes a single ejector through which the anode gas injected from any of the first and second injection devices flows.

8. The fuel cell system according to claim 6, wherein
the ejector mechanism includes first and second ejectors disposed at a downstream side with respect to the first and second injection devices, respectively, and
the circulation path includes first and second branch paths branched from each other and connected to the first and second ejectors, respectively.

9. The fuel cell system according to claim 1, wherein the controller is programmed to perform the pulsating operation in a middle or low load operation of the fuel cell.

* * * * *